(12) United States Patent
Mori et al.

(10) Patent No.: US 8,461,222 B2
(45) Date of Patent: *Jun. 11, 2013

(54) SHOE SOLE COMPONENT (75) Inventors: Sadaki Mori, Kobe (JP); Katsuhiro Imazato, Kobe (JP); Kenichi Harano, Kobe (JP); Akiyuki Morikawa, Kobe (JP)

(73) Assignee: ASICS Corporation, Kobe (JP)

( * ) Notice: Subject to any disclaimer, the term of this patent is extended or adjusted under 35 U.S.C. 154(b) by 11 days.

This patent is subject to a terminal disclaimer.

(21) Appl. No.: 13/185,833

(22) Filed: Jul. 19, 2011

(65) Prior Publication Data

US 2011/0265351 A1    Nov. 3, 2011

Related U.S. Application Data (62) Division of application No. 11/886,047, filed as application No. PCT/JP2006/309388 on May 10, 2006, now Pat. No. 8,008,363.

(30) Foreign Application Priority Data

May 10, 2005  (JP) .................................. 2005-137499

(51) Int. Cl.
*B29C 44/34*  (2006.01)
*C08F 110/00*  (2006.01)
*C08F 210/00*  (2006.01)
*C08F 36/00*  (2006.01)

(52) U.S. Cl.
USPC ........... 521/139; 521/143; 521/144; 521/150; 521/142; 521/146; 525/191; 525/240; 525/241; 36/25 R; 36/32 R (58) Field of Classification Search
USPC .. 521/142, 143, 144, 150, 139, 146; 525/191, 525/240, 241; 36/25 R, 32 R
See application file for complete search history.

(56) References Cited

U.S. PATENT DOCUMENTS

| 6,204,300 | B1 | 3/2001 | Kageoka | |
|---|---|---|---|---|
| 2004/0029987 | A1* | 2/2004 | Sawai | 521/155 |
| 2005/0038131 | A1* | 2/2005 | Narishima et al. | 521/50 |
| 2006/0154998 | A1* | 7/2006 | Shiba et al. | 521/142 |

FOREIGN PATENT DOCUMENTS

| JP | 07-177903 | 7/1995 |
|---|---|---|
| JP | 11-206406 | 8/1999 |
| JP | 11-286566 | 10/1999 |
| JP | 2005-060552 | 3/2005 |
| WO | WO 97/11985 | 4/1997 |
| WO | WO 2005/000958 | 6/2004 |

* cited by examiner

*Primary Examiner* — Irina Krylova
(74) *Attorney, Agent, or Firm* — Mintz, Levin, Cohn, Ferris, Glovsky and Popeo, P.C.

(57) ABSTRACT

There is provided a shoe sole component that has properties such as strength and cushioning property that are suppressed from being changed even under a wide temperature range from severe cold at −10° C. or lower to high temperature conditions exceeding 30° C. A shoe sole component includes a cross-linked foam of a resin composition, the resin composition containing a thermoplastic polyolefin resin, in which tan δ (−20° C. to 40° C.) at a frequency of 10 Hz measured according to JIS K 7244-4 is 0.01 to 0.5, and tan δ (−20° C.)/tan δ (40° C.) at a frequency of 10 Hz is 0.7 to 1.3.

7 Claims, 1 Drawing Sheet

SHOE SOLE COMPONENT

RELATED APPLICATIONS

This application is a divisional application of U.S. Ser. No. 11/886,047 filed on Sep. 10, 2007, now U.S. Pat. No. 8,008,363, which claims Domestic Priority of PCT/JP/2006/309388 filed on May 10, 2006 and Foreign Application Japan 2005-137499 filed May 10, 2005. The entire disclosure of each of these applications is incorporated herein by reference.

TECHNICAL FIELD

The present invention relates to a shoe sole component, and more particularly a shoe sole component for use in, for example, an inner sole, a midsole or an outersole.

BACKGROUND ART

Athletic shoes for use in various athletic activities are made up of various shoe sole components such as an outersole, a midsole and an innersole. A material for these shoe sole components is required to be of a light weight, and have a mechanical strength, a rebound resilience and other properties that can suppress deformation due to the long term use, and are durable against severe use conditions. For this, a cross-linked foam of a resin is mainly used for the shoe sole components.

Hitherto, as a material for a shoe sole component, polyurethane, natural rubber or ethylene-vinyl acetate copolymer is used from the point of view of durability, cost and manufacturing restrictions, and they are cross-link foamed when used as a material for a shoe sole component. Of them, a cross-linked foam of ethylene-vinyl acetate copolymer is frequently used.

Although the cross-linked foam of ethylene-vinyl acetate copolymer has excellent characteristics such as strength and cushioning property under a temperature of 20° C. to 30° C., it poses a problem in that it is hardened and hence has a deteriorated cushioning property under a severe cold for example at −10° C. or lower. In addition, under high temperature environment of 30° C. or higher, the ground is heated to a temperature above the environment and hence the cross-lined foam is excessively softened and has a deteriorated cushioning property. Furthermore, the cross-linked foam has a deteriorated mechanical strength such as tearing strength when it is highly foamed aiming at weight reduction, which may pose a problem in that it cannot be used as a shoe sole.

In order to solve the above problem, Patent Document 1 discloses a cross-linked foam that uses a mixture of ethylene-vinyl acetate copolymer and ethylene-butene copolymer. However, in the existing circumstances, the cross-linked foam of Patent Document 1 has deteriorated strength, cushioning property or other properties under severe cold at a temperature of −10° C. or lower or under high temperature conditions exceeding 30° C., even though it has a lower specific gravity and an improved resilient restoration capability from compression.

Therefore, there is a demand for a shoe sole component that has properties such as strength and cushioning property that are suppressed from being changed even under a wide temperature range from severe cold at −10° C. or lower to high temperature conditions exceeding 30° C.

Patent Document 1: Japanese Patent Application Laid-open No. Hei-11-206406

DISCLOSURE OF THE INVENTION

Problems to be Solved by the Invention

It is an object of the present invention to provide a shoe sole component that has properties such as strength and cushioning property that are suppressed from being changed even under a wide temperature range from severe cold at −10° C. or lower to high temperature conditions exceeding 30° C.

Means to Solve

The present inventors repeatedly made intensive studies in order to achieve the above object found that the above object can be achieved by a shoe sole component that has a cross-linked foam of a resin composition that contains a thermoplastic polyolefin resin and has a predetermined tan $\delta$, and reached the present invention.

Specifically, according to the present invention, there is provided a shoe sole component that is characterized by that it comprises a cross-linked foam of a resin composition, the resin composition containing a thermoplastic polyolefin resin, in which tan $\delta$ (−20° C. to 40° C.) at a frequency of 10 Hz measured according to JIS K 7244-4 is 0.01 to 0.5, and tan $\delta$ (−20° C.)/tan $\delta$ (40° C.) at a frequency of 10 Hz is 0.7 to 1.3.

With the shoe sole component having tan $\delta$ (−20° C. to 40° C.) and tan $\delta$ (−20° C.)/tan $\delta$ (40° C.) respectively in the above ranges, change in cushioning property and buffering property due to the temperature change can be suppressed and hence change in foot comfort can be suppressed.

In the shoe sole component of the present invention, the resin composition containing the thermoplastic polyolefin resin preferably contains at least two different resin components, including a first resin component having a property that: tan $\delta$ (−20° C.)/tan $\delta$ (40° C.) at a frequency of 10 Hz measured according to JIS K 7244-4 is 0.5 to 1.5, a specific gravity measured according to JIS K 7311 is 0.85 to 0.95, a storage elastic modulus E' (20° C.) at 20° C. and at a frequency of 10 Hz measured according to JIS K 7244-4 is 100 to less than 500 MPa, and a loss elastic modulus measured according to JIS K 7244-4 is not more than 40 MPa, and a second resin component having any one of properties including:

a property that a storage elastic modulus E' (20° C.) at 20° C. and at a frequency of 10 Hz measured according to JIS K 7244-4 is 10 to less than 100 MPa and a loss elastic modulus measured according to JIS K 7244-4 is not more than 10 MPa; and a property that a storage elastic modulus E' (20° C.) at 20° C. and at a frequency of 10 Hz measured according to JIS K 7244-4 is 500 to 2000 MPa and a loss elastic modulus measured according to JIS K 7244-4 is not more than 50 MPa.

The shoe sole component of the present invention is formed by a cross-linked foam of a resin composition containing the first resin component and the second resin component respectively having the above properties, so that the change in buffering property such as cushioning property, due to the temperature change is further suppressed and thus foot comfort is further enhanced. Furthermore, it is possible to maintain the mechanical strength such as the tearing strength even if the resin composition has been highly foamed.

In the shoe sole component of the present invention, it is preferable that a storage elastic modulus E' (−20° C. to 40° C.) at −20 to 40° C. and at a frequency of 10 Hz measured according to JIS K 7244-4 is 2 to 50 MPa and a value of E'(−20° C.)/E'(40° C.) in a storage elastic modulus E'(−20° C.) at −20° C. and a storage elastic modulus E'(40° C.) at 40° C. is 2 to 20.

The shoe sole component of the present invention having the storage elastic moduli in the above numerical ranges is unlikely to be excessively hardened even at −20° C. and hence provides a good cushioning property, as well as being unlikely to be excessively softened even at 40° C. and hence providing a good cushioning property.

In the shoe sole component of the present invention, it is preferable that a main transition peak temperature measured by differential scanning calorimetry (DSC) according to JIS K 7121 is 90 to 105° C., and the heat of transition measured by differential scanning calorimetry (DSC) according to JIS K 7122 is 60 to 100 J/g.

The shoe sole component of the present invention having the main transition peak temperature and the like in the above numerical ranges provides a better cushioning property.

In the shoe sole component of the present invention, it is preferable that a specific gravity measured according to JIS K 7311 is 0.05 to 0.2.

The shoe sole component of the present invention having the specific gravity in the above range enables the reduction of weight as compared with a conventional shoe sole component.

In the shoe sole component of the present invention, it is preferable that a compression set value measured according to ASTM D395 for 22 hours at 20±3° C. is not more than 65%.

The shoe sole component of the present invention having the compression set value in the above value or below is strong enough for repeated pressing during running and hence minimizes wear-out due to use.

In the shoe sole component of the present invention, it is preferable that a C hardness at 20° C. measured according to Japan Rubber Association Standard SRIS0101 is 35 to 70.

The shoe sole component of the present invention having the C hardness in the above range provides more improved buffering property and hence can absorb vibrations and impacts during running.

In the shoe sole component of the present invention, it is preferable that a tearing strength measured according to JIS K 6252 is not less than 8.8 kN/m.

The shoe sole component of the present invention having the above tearing strength can withstand damages or the like due to external force when it is actually used.

In the shoe sole component of the present invention, it is preferable that a rebound resilience measured according to JIS K 6255 is not less than 40%.

The shoe sole component of the present invention having the above rebound resilience provides more improved cushioning property and hence enables stable running.

The shoe sole component of the present invention preferably contains 60 to 95 parts by weight of the thermoplastic polyolefin resin in 100 parts by weight of a resin of the resin composition.

Advantage of the Invention

The shoe sole component of the present invention can deal with change in buffering property such as cushioning property in a wide temperature range, and more specifically is unlikely to be excessively hardened even at −20° C. and thus makes it possible to provide a good cushioning property, as well as being unlikely to be excessively softened even at 40° C. and thus making it possible to provide a good cushioning property. Thus a significant advantage can be produced. The shoe sole component of the present invention is of a light weight and produces a significant advantage in mechanical property, such as tearing strength and resilient restoration property.

BEST MODE FOR CARRYING OUT THE INVENTION

A shoe sole component of the present invention is made up of a cross-linked foam of a resin composition, and has tan δ (−20° C. to 40° C.) of 0.01 to 0.5 at a frequency of 10 Hz measured according to JIS K 7244-4, and a value of tan δ (−20° C.)/tan δ (40° C.) at a frequency of 10 Hz being 0.7 to 1.3.

In the present invention, attention was focused on a parameter, namely tan δ.

Herein, tan δ is a parameter widely used for studying vibration absorption capability or the like of a viscoelastic substance such as rubber, serves as an index showing dynamic characteristics of a viscoelastic substance (a component exhibiting elasticity in response to fast deformation and exhibiting viscous flow in response to slow deformation). This tan δ is called as a loss modulus of dynamic viscoelasticity and is represented by the following formula:

(loss modulus tan δ)=(loss elastic modulus $E''$)/(storage elastic modulus $E'$)

Tan δ is used as a measure of energy absorption capability of its own during dynamic behavior, and it is meant that as the larger the tan δ the better the energy absorption or the buffering property.

The storage elastic modulus is herein meant a real number portion of the complex elastic modulus and represents the stiffness of a viscoelastic substance during dynamic behavior. The loss elastic modulus is herein meant an imaginary number portion of the complex elastic modulus and represents the lost energy of a viscoelastic substance during dynamic behavior. Furthermore, the complex elastic modulus is meant dynamic stress and dynamic strain at a sinusoidal frequency of a viscoelastic substance. When sinusoidal oscillations are applied to a viscoelastic substance, a phase difference between stress and strain is caused. The complex elastic modulus is calculated from this phase difference.

In order to obtain stabilized buffering property in a wide temperature range, tan δ of the shoe sole component of the present invention is set so that tan δ (−20° C. to 40° C.) at a frequency of 10 Hz is 0.01 to 0.5, preferably 0.02 to 0.4, more preferably 0.03 to 0.3, and further preferably 0.05 to 0.3, and a value of tan δ (−20° C.)/tan δ (40° C.) at a frequency of 10 Hz is 0.7 to 1.3, preferably 0.8 to 1.3, more preferably 0.8 to 1.2, and further preferably 0.9 to 1.1.

When tan δ (−20 to 40° C.) is within a range of 0.01 to 0.5, a shoe sole component has a stabilized buffering property in a wide temperature range, and can be appropriately used. When a value of tan δ (−20° C.)/tan δ (40° C.) is within a range of 0.7 to 1.3, properties such as buffering property is unlikely to be greatly changed due to the environmental temperature, and therefore the shoe sole component can be appropriately used.

Tan δ is measured by a method described in Examples.

The above temperature range is set within a range from −20° C. to 40° C. for the reason that it is not uncommon that the ambient temperature of a cold region or the like is lowered below −20° C., and therefore there is a demand for a shoe sole component having performances such as buffering property equivalent to buffering property at ordinary temperature (e.g., 25° C.).

The temperature is set at 40° C. for the reason that when the ambient temperature is increased and a high temperature condition (e.g., not lower than 30° C.) is reached, for example, asphalt frequently is heated to a temperature exceeding 40° C. Therefore, under this environment, there is also a demand for a shoe sole component having performances such as buffering property equivalent to buffering property at ordinary temperature (e.g., 25° C.).

The frequency is set at 10 Hz for the reason that when a human walks or runs, a natural frequency applied to the shoe sole component is normally 7 to 12 Hz.

In the shoe sole component of the present invention, a storage elastic modulus E' (−20° C. to 40° C.) at −20° C. to 40° C. and at a frequency of 10 Hz measured according to JIS K 7244-4 is 2 to 50 MPa, and a value of E'(−20° C.)/E'(40° C.) in a storage elastic modulus E'(−20° C.) at −20° C. and a storage elastic modulus E'(40° C.) at 40° C. is 2 to 20; and preferably, a storage elastic modulus E' (−20° C. to 40° C.) at −20° C. to 40° C. and at a frequency of 10 Hz measured according to JIS K 7244-4 is 5 to 15 MPa and a value of E'(−20° C.)/E'(40° C.) in a storage elastic modulus E' (−20° C.) at −20° C. and a storage elastic modulus E' (40° C.) at 40° C. is 2 to 10. When the storage elastic modulus E' (−20° C. to 40° C.) at a frequency of 10 Hz measured according to JIS K 7244-4 is within a range of 2 to 50 MPa, a shoe sole component is unlikely to be excessively hardened even under low temperature, thus obtaining a satisfactory buffering property, as well as being unlikely to be worn out under high temperature, thus obtaining a satisfactory buffering property. When a value of E' (−20° C.)/E' (40° C.) is within a range of 2 to 20, it is possible to limit changes in property such as buffering property, due to the temperature change, and thus to provide a stable shoe sole component.

The storage elastic modulus is measured by a method described in Examples.

In the shoe sole component of the present invention, a main transition peak temperature measured by differential scanning calorimetry (DSC) according to JIS K 7121 is 90 to 105° C., and the heat of transition by differential scanning calorimetry (DSC) measured according to JIS K 7122 is 60 to 100 J/g.

When the main transition peak temperature is within a range of 90 to 105° C., it is possible to provide good workability; and when the heat of transition is within a range of 60 to 100 J/g, the shoe sole component has amorphous amount capable of forming an appropriate cross-linked structure so that a shoe sole component having a better cushioning property can be obtained.

The main transition peak temperature and the heat of transition are measured by methods described in Examples.

The shoe sole component of the present invention has a specific gravity of 0.05 to 0.2, preferably 0.07 to 0.2, and more preferably 0.07 to 0.15.

When the specific gravity is within the above range, it is possible to obtain a component being of a light weight and having a satisfactory strength as a shoe sole component.

When the shoe sole component is used as a midsole, the specific gravity thereof is 0.08 to 0.15 and preferably 0.10 to 0.13.

The midsole is located at an intermediate position between an outersole and an innersole, and serves to absorb the largest part of impact caused during running or the like, and therefore when the specific gravity is within the above range, it is possible to appropriately absorb impact during running or the like and also keep the weight light.

When the shoe sole component is used as an outersole, the specific gravity thereof is 0.13 to 0.2, and preferably 0.15 to 0.18.

The outersole is a portion directly contacting the ground and therefore when the specific gravity is within the above range, it is possible to reduce the wear-out due to the running or the like and keep the weight light.

When the shoe sole component is used as an innersole, the specific gravity thereof is 0.05 to 0.12, and preferably 0.07 to 0.10.

The innersole is a portion which a foot of a wearer directly contacts and therefore when the specific gravity is within the above range, it is possible to obtain better feeling during running and keep the weight light.

The specific gravity is measured by a method described in Examples.

The shoe sole component of the present invention has a compression set value of not more than 65% and preferably 40 to 65% measured according to ASTM D395 for 22 hours at 20±3° C.

When the compression set value is not more than 65%, bubbles (foamed cells) in the shoe sole component are restored to original state every time they are subject to impact compression during running or the like, and stable cushioning property can be maintained.

The shoe sole component of the present invention has the aforesaid C hardness being 35 to 70, preferably 40 to 70, more preferably 40 to 65 and further preferably 45 to 60.

When the C hardness is within the above range, a shoe fabricated by using the shoe sole component can have a stabilized structure and obtain a required strength.

The shoe sole component of the present invention has a tearing strength of not less than 8.8 kN/m and preferably 10 to 15 kN/m.

When the tearing strength is not less than 8.8 kN/m, the shoe sole component can withstand damages due to external force during actual use. For example, when the tearing strength is not less than 8.8 kN/m, the component is unlikely to be damaged even if the wearer runs on gravels or the like.

The tearing strength is measured by a method described in Examples.

The shoe sole component of the present invention has a rebound resilience of not less than 40%, preferably not less than 45% and more preferably not less than 50%.

The upper limit of the rebound resilience is preferably set as high as possible in order to provide high rebound resilience, while being preferably set at not more than 80% when taking into account manufacturing conditions of the shoe sole component. From these points of view, the rebound resilience of the shoe sole component of the present invention is 40 to 80%, more preferably 45 to 80% and further preferably 50 to 80%.

The rebound resilience is measured by a method described in Examples.

Now, the description will be made for a material and the like forming a shoe sole component of the present invention.

The shoe sole component of the present invention is formed by a cross-linked foam of a resin composition containing a thermoplastic polyolefin resin.

Plural resin components are preferably used for a resin composition containing the thermoplastic polyolefin resin, and specifically the following two types of resin components including a first resin component and a second resin component are preferably used.

In the shoe sole component of the present invention, the resin composition containing the thermoplastic polyolefin resin preferably contains at least two different resin components, including a first resin component having a property that: tan $\delta$ ($-20°$ C.)/tan $\delta$ ($40°$ C.) at a frequency of 10 Hz measured according to JIS K 7244-4 is 0.5 to 1.5, a specific gravity measured according to JIS K 7311 is 0.85 to 0.95, a storage elastic modulus E' ($20°$ C.) at $20°$ C. and at a frequency of 10 Hz measured according to JIS K 7244-4 is 100 to less than 500 MPa, and a loss elastic modulus measured according to JIS K 7244-4 is not more than 40 MPa, and a second resin component having any one of properties including:

a property that a storage elastic modulus E' ($20°$ C.) at $20°$ C. and at a frequency of 10 Hz measured according to JIS K 7244-4 is 10 to less than 100 MPa and a loss elastic modulus measured according to JIS K 7244-4 is not more than 10 MPa; and a property that a storage elastic modulus E' ($20°$ C.) at $20°$ C. and at a frequency of 10 Hz measured according to JIS K 7244-4 is 500 to 2000 MPa and a loss elastic modulus measured according to JIS K 7244-4 is not more than 50 MPa.

The first resin component has all the properties as mentioned above.

As mentioned above, as a first property, it can be cited a property that a value of tan $\delta$ ($-20°$ C.)/tan $\delta$ ($40°$ C.) at temperatures of $-20°$ C. and $40°$ C. and at a frequency of 10 Hz measured according to JIS K 7244-4 is 0.5 to 1.5.

This means that the first resin component is a material that does not have a glass transition point (Tg) in a temperature range of $-20°$ C. to $40°$ C. When a material does not have a glass transition point in this temperature range, it is meant that the material has less temperature dependency, such as cushioning property.

As a second property, it can be cited a property that a specific gravity measured according to JIS K 7311 is not more than 0.95.

This means that the specific gravity of the cross-linked foam can be reduced when the specific gravity is not more than 0.95. The lower limit of the specific gravity is preferably as low as possible, but is not less than 0.85 in consideration of the manufacturable range.

As mentioned above, as a third property, it can be cited a property that a storage elastic modulus E' ($20°$ C.) at a temperature of $20°$ C. and at a frequency of 10 Hz measured according to JIS K 7244-4 is 100 to less than 500 MPa, and a loss elastic modulus at a temperature of $20°$ C. and at a frequency of 10 Hz measured according to JIS K 7244-4 is not more than 40 MPa.

This means that the shoe sole component has a hardness required as a shoe sole when the storage elastic modulus E' is within the above range, while the shoe sole component has a rebound resilience required as a shoe sole when the loss elastic modulus is within the above range. The lower limit of the loss elastic modulus is preferably as low as possible, but is not lower than 10 MPa in consideration of the manufacturing range.

As a property required for the second resin component, it preferably has any one of properties: namely a property that a storage elastic modulus E' ($20°$ C.) at $20°$ C. and at a frequency of 10 Hz measured according to JIS K 7244-4 is 10 to less than 100 MPa and a loss elastic modulus at $20°$ C. and at a frequency of 10 Hz measured according to JIS K 7244-4 is not more than 10 MPa and preferably 1 to 10 MPa; and a property that a storage elastic modulus E' ($20°$ C.) at $20°$ C. and at a frequency of 10 Hz measured according to JIS K 7244-4 is 500 to 2000 MPa and a loss elastic modulus at $20°$ C. and at a frequency of 10 Hz measured according to JIS K 7244-4 is not more than 50 MPa and preferably 10 to 50 MPa.

By the use of the second resin component having the above property, it is possible to improve a tearing strength and a compression set required as a property of a shoe sole component.

As the first resin component, as long as the above requirements are met, it is possible to use, for example, low density polyethylene, medium density polyethylene, ethylene-α-olefin copolymer, ethylene-propylene rubber (EPDM), ionomer, polybutene, ethylene-methacrylic acid copolymer, and olefin elastomer such as dynamically cross-linked polymer obtained from polypropylene (PP) and ethylene-propylene rubber (EPDM). Of them, preferably used are ethylene-α-olefin copolymer, and dynamically cross-linked polymer obtained from polypropylene (PP) and ethylene-propylene rubber (EPDM).

As a thermoplastic polyolefin resin used for the first resin component, ethylene-vinyl acetate copolymer is preferably excluded.

The ethylene-α-olefin copolymer is obtained by copolymerization of ethylene with α-olefin, and it can be cited, as the α-olefin, propylene, butene-1, hexene-1, octene-1,4-methyl-1-pentene or the like having carbon numbers of 3 to 12.

The dynamically cross-linked polymer is meant a thermoplastic polyolefin resin obtained by cross-linking a rubber component as a soft segment while at the same time physically dispersing a hard segment such as PP and a soft segment such as EPDM by using a kneading machine such as a Banbbury mixer and a biaxial extruder.

According to JIS K 6922-2, the low density polyethylene is meant polyethylene having a specific gravity in a range of from 0.91 or more but less than 0.93, and the medium density polyethylene is meant polyethylene having a specific gravity in a range of from 0.93 or more but less than 0.942.

The above resins as the first resin component may be solely used or two or more kinds of them are preferably used in combination with each other.

As the second resin component, as long as the above requirements are met, it can be cited at least one selected from the group consisting of a thermoplastic polyolefin resin, a styrene resin, an urethane resin and a polyester resin. The styrene resin, the urethane resin and the polyester resin are preferably thermoplastic resins.

The styrene resin is meant a resin having a content of styrene of 20 to 90% by weight, preferably 40 to 80% by weight and further preferably 65 to 75% by weight in the styrene resin. When a styrene resin having a content of styrene within the above ranges is used, a sufficient strength for the shoe sole component can be obtained even when a resin is highly foamed aiming at weight reduction of the shoe sole component.

As specific examples of the styrene resin, it can be cited SEBS (styrene-ethylene-butylene-styrene copolymer), SEPS (styrene-ethylene-propylene-styrene copolymer), SBS (styrene-butadiene-styrene copolymer), SIS (styrene-isoprene-styrene copolymer), SBBS (styrene-butadiene-butylene-styrene copolymer), HSBR (Highstyrene-butadiene rubber) and the like.

The above copolymers as the styrene resin may be solely used or two or more kinds of them may be used in combination with each other.

As specific examples of the urethane resin, it can be cited polyether polyurethane and polyester polyurethane.

As specific examples of the polyester resin, it can be cited polyethylene terephthalate, polybutylene terephthalate, polytrimethylene terephthalate, polyethylene naphthalate, polybutylene terephthalate-polyether copolymer, and polybutylene terephthalate-polytetramethylene ether glycol copolymer.

Now, the specific explanation will be given. When, for example, a thermoplastic polyolefin resin is used as the first resin component serving as a soft segment in a cross-linked foam, the resin preferably has a low specific gravity and a large amount of an amorphous portion. A thermoplastic polyolefin resin having a low specific gravity and a large amount of an amorphous portion achieves improvement in cushioning property when it has been cross-link foamed.

When a thermoplastic polyolefin resin is used as the second resin component serving as a hard segment for improving the strength of the cross-linked foam, it is possible to use, for example, high-density polyethylene (HD-PE), ultra-high molecular weight polyethylene and polypropylene for it. According to JIS K6922-2, the high-density polyethylene is polyethylene having a specific gravity of not less than 0.942, and the ultra-high molecular weight polyethylene is polyethylene having a number average molecular weight of not less than 5,500,000.

As a preferable combination of the first resin component and the second resin component, it can be cited a combination of a thermoplastic polyolefin resin meeting the above given requirements as the first resin component and a thermoplastic polyolefin resin meeting the requirements of the second resin component.

As another preferable combination of the first resin component and the second resin component, it can be cited a combination of a thermoplastic polyolefin resin meeting the given requirements as the first resin component, and at least one of styrene resin, urethane resin and polyethylene resin meeting the above given requirements as the second resin component.

As a more specific example of a preferable combination, it can be cited a combination of ethylene-α-olefin as a thermoplastic polyolefin resin meeting the requirements of the first resin component and SEBS, HSBR or SBBS as styrene resin or HD-PE as a polyolefin resin, meeting the requirements of the second resin component.

It can also be cited a combination of the dynamically cross-linked polymer as a thermoplastic polyolefin resin meeting the requirements of the first resin component and SEBS, HSBR or SBBS as the styrene resin or HD-PE as a polyolefin resin, meeting the requirements of the second resin component.

The resin composition contains a thermoplastic polyolefin resin, and specifically contains 60 to 95 parts by weight of the thermoplastic polyolefin resin in 100 parts by weight of a resin of the resin composition, and preferably contains 70 to 90 parts by weight of the thermoplastic polyolefin resin in 100 parts by weight of the resin composition.

With the resin composition containing the thermoplastic polyolefin resin within the above ranges, a cross-linked foam having uniform cells can be obtained.

For example, in 100 parts by weight of a resin composition, 60 to 95 parts by weight and preferably 70 to 90 parts by weight of the thermoplastic polyolefin resin meeting the requirements of the first resin component, and 5 to 40 parts by weight and preferably 10 to 30 parts by weight of the styrene resin meeting the requirements of the second resin component are blended.

With the resin components blended in the above ranges, a cross-linked foam having more uniform cells can be obtained.

A resin component (third resin component) having a property different from the properties of the first resin component and the second resin component can be added to the resin composition. The amount of the third resin component to be blended may be appropriately adjusted within such a range as not to deteriorate the property of the shoe sole component of the present invention.

The shoe sole component of the present invention can be obtained by adding a cross-linking agent, a foaming agent, a filling agent, a cross-linking auxiliary agent and a processing material to the resin composition, and cross-link foaming them under given conditions.

As specific examples of the cross-linking agent used in the present invention, it can be cited organic peroxides, such as dicumyl peroxide, di-t-butyl peroxide, 2,5-dimethyl-2,5-di-(t-butyl peroxy)hexane, 2,5-dimethyl-2,5-di-(t-butyl peroxy)hexyne-3,1,3-bis-(t-butylperoxyisopropyl)benzene, 1,1-bis(t-butyl peroxy)-3,3,5-trimethyl cyclohexane, n-butyl-4,4-bis(t-butyl peroxy) valerate, benzoyl peroxide, p-chloro benzoyl peroxide, 2,4-dichlorobenzoyl peroxide, t-butyl peroxy benzoate, t-butyl per benzoate, t-butyl peroxy isopropyl carbonate, diacetyl peroxide, lauloyl peroxide, and t-butyl cumyl peroxide.

In the present invention, the cross-linking agent is used in the ratio of, normally 0.3 to 0.8 parts by weight, and preferably 0.4 to 0.7 parts by weight with respect to 100 parts by weight of the resin composition.

With the cross-linking agent used in the above ratios, a cross-linked foam having an appropriate cross-linked structure can be obtained.

As specific examples of the foaming agent used in the present invention, it can be cited an organic heat decomposition-type foaming agent, such as an azo compound such as azodicarbon amide (ADCA), 1,1'-azobis (1-acetoxy-1-phenylethane), dimethyl-2,2'-azobis butyrate, dimethyl-2,2'-azobis isobutyrate, 2,2'-azobis(2,4,4-trimethylpentane), 1,1'-azobis(cyclohexane-1-carbonitrile), and 2,2'-azobis(N-(2-carboxyethyl)-2-methyl-propionamidine); a nitroso compound such as N,N'-dinitrosopentamethylene tetramine (DPT); a hydrazine derivative such as 4,4'-oxybis(benzenesulfonylhydrazide), and diphenyl-sulfone-3,3'-disulfonylhydrazide; a semicarbazide compound such as p-toluenesulfonyl semicarbazide; and trihydrazino triazine, and an inorganic heat decomposition-type foaming agent, such as a hydrogen carbonate such as sodium hydrogencarbonate and ammonium hydrogencarbonate; a carbonate such as sodium carbonate; a nitrite such as ammonium nitrite; and a hydrogen compound.

It is also possible to use an organic foaming agent, such as various aliphatic hydrocarbons such as methanol, ethanol, propane, butane, pentane and hexane; various chlorinated hydrocarbons such as dichlorethane, dichlormethane and carbon tetrachloride; various fluoro-chlorinated hydrocarbons such as chlorofluorocarbon, and an inorganic foaming agent such as air, carbon dioxide, nitrogen, argon and water.

In the present invention, the foaming agent is used in the ratio of, normally 3 to 20 parts by weight, and preferably 5 to 10 parts by weight with respect to 100 parts by weight of the resin composition.

As the filling agent, those usually used in the relevant field are used without specific limitation, and as examples thereof, it can be cited carbon black, carbon nanotube, fullerene, silica, magnesium carbonate, calcium carbonate, clay, talc, magnesium hydrate, aluminium hydroxide and calcium silicate.

The filling agent is used in the ratio of, normally 0.5 to 10 parts by weight, and preferably 1 to 5 parts by weight with respect to 100 parts by weight of the resin composition.

Any cross-linking auxiliary agent may be used as long as it is known as a cross-linking auxiliary agent, and as examples thereof, it can be cited divinylbenzene, trimethylolpropane trimethacrylate, 1,6-hexanediol methacrylate, 1,9-nonandiol methacrylate, 1,10-decanediol dimethacrylate, trimellitic acid triarylester, triaryl isocyanate, neopentyl glycol dimethacrylate, 1,2,4-benzene tricarboxylate triallyl ester, tricycle decandimethacrylate, and polyethylene glycol diacrylate. Two or more kinds of them may be used in combination with each other.

The cross-linking auxiliary agent may be appropriately added to the resin composition when in use.

As examples of the processing material, it can be cited paraffinic oil, naphthenic oil, fatty acid ester such as stearate ester, phosphate ester and adipate ester, dibutyl phthalate, dioctyl phthalate, and dioctyl adipate.

The shoe sole component of the present invention is manufactured by a kneading step for obtaining a resin composition and a molding step for obtaining a cross-linked foam in which the resin composition is cross-link foamed.

A conventional resin-composition manufacturing method can be used for the kneading step without specific limitation, and for example, there may be employed a method involving blending ethylene-α-olefin copolymer and styrene-ethylene-butylene-styrene copolymer in molten state, thereby preparing a resin composition. For this blending method, a single screw extruder, a twin screw extruder, a Banbury mixer, a roll kneading machine, a kneader, PLASTMILL or the like is employed, and a melt-kneading temperature is preferably 100 to 300° C.

As an example of a cross-link foaming method used in processing the resin composition into a cross-linked foam, it can be cited a method including kneading a decomposition-type foaming agent into ethylene-α-olefin copolymer and styrene-ethylene-butylene-styrene copolymer, then molding it into a given shape, then irradiating electron beam on it allowing for cross-linking the same, and heating it to a temperature higher than a temperature at which the decomposition-type foaming agent is decomposed, or a method including mixing a decomposing-type foaming agent as well as peroxide into ethylene-α-olefin copolymer and styrene-ethylene-butylene-styrene copolymer, then also kneading the mixture at a temperature at which the peroxide and the dispersing type foaming agent are not decomposed, then molding it into a given shape, then heating it to a temperature at which the peroxide is decomposed allowing for cross-linking, and then further heating allowing for foaming. A cross-linking auxiliary agent may be used according to needs and circumstances in any one of the case where the cross-linking is made by irradiation of electron beam, and the case where the cross-linking is made by peroxide.

According to the shoe sole component of the present invention, known additives, such as heat stabilizer, weather resistant agent, frame retardant, frame retarding auxiliary, dispersing agent, pigment, fluidity modifying agent and mold-releasing agent may be added within a scope of the present invention.

EXAMPLES

Now, the description will be made for the Examples of the present invention without intention to limit the present invention to these Examples.

(Measuring Method of Dynamic Viscoelasticity)

The measurement was made according to JIS K 7244-4.

For a cross-link foamed sample (length: 33±3 mm, width: 4±1 mm, thickness: 2±1 mm), the dynamic viscoelasticity thereof was measured under the conditions: frequency of 10 Hz (stopping vibration), measuring mode (tensile mode of sinusoidal strain), distance between chucks (20 mm), load (automatic static loading), dynamic strain (3 to 5 μm), temperature (−80 to 80° C., temperature rising rate: 3° C./min, stepwise temperature: 5° C.), by using a dynamic viscoelasticity analyzer "Rheogel-E4000" made by UBM Co. Ltd.

(Measuring Method of Specific Gravity)

The measuring was made according to JIS K 7311 (underwater displacement method).

For a cross-link foamed sample (length: 10±3 mm, width: 10±3 mm, thickness: 2±0.5 mm), the specific gravity thereof was measured at a temperature of 20±3° C. by using an electron specific gravity meter "MD200S" manufactured by Alfa Mirage Co., Ltd.

In the underwater displacement method, the specific gravity (D) was calculated by the following formula from the weight (W1) in air and the weight (W2) in water.

$$D = W1/(W1 - W2)$$

(Measuring Method of Compression Set)

The measurement was made by a compression set A method according to ASTM D395.

For a cross-link foamed sample (diameter: 29±1 mm, thickness: 4±1 mm), the compression set (C) thereof was calculated by the following formula from the thickness (T1) after the sample was subjected to a load of 0.55 MPa for 22 hours and the thickness (T0) before loading at an environmental temperature (20±3° C.) by using a constant load tester determined according to ASTM D395.

$$C = ((T0 - T1)/T0) \times 100$$

(Measuring Method of C Hardness)

The measurement was made according the standard of the Society of Rubber Industry, Japan (SRIS 0101).

For a cross-link foamed sample (length: 50±5 mm, width: 50±5 mm thickness: 10±1 mm), the C hardness thereof was determined, using a spring type hardness test device model C (manufactured by KOBUNSHI (Asker) (Japan), Model C Hardness Tester) determined according to SRIS 0101, by pressing with a load of 9.81 N at a temperature of 20±3° C., and then reading the scale within 2 seconds.

(Measuring Method of Rebound Resilience)

The measurement was made according to JIS K 6255.

For a cross-link foamed sample (diameter: 30±1 mm, thickness: 13±1 mm), by the use of Lupke rebound resilience tester "VR-501" manufactured by Ueshima Seisakusho Co., Ltd., a pointer (%) thereof was read at a time (height after rebounding) at which an impact bar (pendulum) has stopped after rebounding at an environmental temperature of 20±3° C., and was designated as a rebound resilience rate of the cross-link foam sample.

(Measuring Method of Tearing Strength)

The measurement was made according to JIS K 6252.

The measurement was made by the use of "Strograph R2" manufactured by Toyo Seiki Seisaku-sho, LTD.

A cross-linked foam sample was formed into a given shape determined according to JIS K 6252, and the tearing strength (TR) thereof was calculated by the following formula from the tear load (F) at the time, at which the sample has been pulled at a rate of 500 mm/min, and the thickness (t) before testing.

$$TR = F/t$$

(Measuring Method of Main Transition Peak Temperature)

The measurement was made according to JIS K 7121.

The measurement was made by the use of "DSC200" (a differential scanning calorimeter) manufactured by Seiko Instruments Inc. A sample (3 to 5 mg) was filled in a sealing type aluminium container having a diameter of 5 mm, and then the container was sealed with an aluminium lid. This was set on the above instrument, and the measurement was made at −50 to 250° C. (temperature rising rate: 10° C./min) and with a sampling time of 0.5 sec (every 0.5 sec). When plural peaks exist, a largest peak was designated as a main transition peak, and the temperature of the top of the peak was read and this was designated as a main transition peak temperature.

(Measuring Method of Heat of Transition)

The measurement was made according to JIS K 7122. The measurement was made by the use of "DSC200" (a differential scanning calorimeter) manufactured by Seiko Instruments Inc. A sample (3 to 5 mg) was filled in a sealing type aluminium container having a diameter of 5 mm, and then the container was sealed with an aluminium lid. This was set on the above instrument, and the measurement was made at −50 to 250° C. (temperature rising rate: 10° C./min) and with a sampling time of 0.5 sec.

When a base line of the aforesaid main transition peak temperature is straight, a point separating from the base line around the transition and a point returning to the base line is connected with a straight line, and the area of this portion is calculated by a Simpson method, and the heat of transition was calculated from this value ("a" method).

On the other hand, when the base line of the main transition peak is curved, two points are connected with the curve, and the area of this portion is calculated by a Simpson method, and the heat of transition was calculated from this value ("b" method).

When the aforesaid main transition peak contains other small peaks or shoulder portions or the like, the heat of transition of the main transition peak temperature containing the shoulder portions was calculated by the "a" method.

Example 1

90 parts by weight of ethylene-α-olefin copolymer (manufactured by Mitsui Chemicals, Inc., "TAFMER" DF110), and 10 parts by weight of styrene-butadiene-butylene-styrene copolymer (SBBS) (manufactured by Asahi Kasei Chemicals Corporation, "TUFTEC" P1000) were put into a sealing type kneader (kneader) heated to 100° C. to 150° C., and were melt kneaded for 6 to 10 minutes at 40 rpm. Then, a given amount of each of a foaming agent, a cross-linking agent and a processing material was added into the melt kneaded subject by using an open roll heated to 100° C. to 120° C., and they were dispersion kneaded for about 8 to 15 minutes. Thus, a resin composition was obtained. 500 to 600 g of this resin composition was filled in a mold having a length of 150 mm, a width of 150 mm and a thickness of 20 mm, and press-molded for 30 to 35 minutes under a pressure of 15 MPa. Thus, a cross-linked foam was prepared.

For a cross-linked foam to be served for measurement of dynamic viscoelasticity (tan δ), the thus prepared cross-linked foam may be used without any processes applied thereto, while it may be compressed by a heat mold to have a given specific gravity. In this case, 20 to 40 g of the cross-linked foam was filled in a mold having a length of 130 mm, a width of 220 mm and a thickness of 1 to 5 mm, pressed under a pressure of 15 MPa for 5 minutes at a temperature of 160° C., and then pressed under a pressure of 15 MPa at a temperature of 25° C. for cooling. By using them, various properties were measured. The results are shown in Table 1.

Resins respectively used in the Examples, the mixed contents (parts by weight) of the respective additives and various properties of the prepared cross-linked foams are shown in Table 1.

Values at the time when the measurement of tan δ were made are graphed and shown in Table 1.

Example 2 to Comparative Example 8

In place of the resin material and the mixed content used in Example 1, cross-linked foams were molded by the resin materials and the mixed contents shown in Table 1 by the same method, and the respective properties were measured. The results are shown in Table 1.

Table 1 follows:

| | | Example 1 | Example 2 | Example 3 | Example 4 | Example 5 | Example 6 | Example 7 | Example 8 | Example 9 | Example 10 | Example 11 | Example 12 | Example 13 | Example 14 |
|---|---|---|---|---|---|---|---|---|---|---|---|---|---|---|---|
| Mixed Contents of Resin Compositions | EVA 1 | | | | | | | | | | | | | | |
| | EVA 2 | | | | | | | | | | | | | | |
| | PE1 | | | | | | | | | | | | | | |
| | PE2 | | | | | | | | | | | | | | |
| | PE3 | | | | | 10 | | | | | | | | | |
| | PE4 | | | | 10 | | | | | | | | | | |
| | PE5 | 90 | 90 | 90 | 90 | 90 | 90 | | 70 | 95 | 80 | 70 | 60 | 70 | 80 |
| | PE6 | 10 | | | | | | | 20 | | | | | | |
| | ST1 | | 10 | | | | | 90 | | | | | | | |
| | ST2 | | | 10 | | | 10 | 10 | 10 | 5 | 20 | 30 | 40 | 30 | 20 |
| | ST3 | | | | | | | | | | | | | | |
| | ST4 | | | | | | | | | | | | | | |
| | ST5 | | | | | | | | | | | | | | |
| | Cross-linking Agent (*1) | 0.6 | 0.6 | 0.6 | 0.6 | 0.6 | 0.6 | 0.6 | 0.6 | 0.6 | 0.6 | 0.6 | 0.6 | 0.6 | 0.6 |
| | Foaming Agent (*2) | 5 | 6.5 | 5 | 5 | 6.5 | 5 | 6.5 | 5 | 5 | 5 | 5 | 5 | 5 | 5 |
| | Filling Agent (*3) | 3 | 3 | 3 | 3 | 3 | 3 | 3 | 3 | 3 | 3 | 3 | 3 | 3 | 3 |
| | Processing Material (*4) | 0.5 | 0.5 | 0.5 | 0.5 | 0.5 | 0.5 | 0.5 | 0.5 | 0.5 | 0.5 | 0.5 | 0.5 | 0.5 | 0.5 |
| Properties of Crosslinked Foams | tan δ (−20 to 40° C.) Max Value | 0.16 | 0.14 | 0.16 | 0.14 | 0.13 | 0.12 | 0.14 | 0.15 | 0.15 | 0.15 | 0.14 | 0.20 | 0.19 | 0.17 |
| | tan δ (−20 to 40° C.) Min Value | 0.14 | 0.13 | 0.12 | 0.12 | 0.12 | 0.09 | 0.12 | 0.13 | 0.11 | 0.10 | 0.08 | 0.12 | 0.11 | 0.13 |
| | tan δ (−20° C.) | 0.15 | 0.13 | 0.12 | 0.12 | 0.13 | 0.09 | 0.14 | 0.14 | 0.15 | 0.11 | 0.12 | 0.16 | 0.16 | 0.17 |
| | tan δ (40° C.) | 0.14 | 0.14 | 0.13 | 0.14 | 0.13 | 0.12 | 0.14 | 0.13 | 0.12 | 0.15 | 0.09 | 0.20 | 0.19 | 0.17 |
| | tan δ (−20)/tan δ (40° C.) | 1.10 | 0.96 | 0.90 | 0.84 | 1.01 | 0.75 | 1.02 | 1.09 | 1.27 | 0.74 | 1.28 | 0.80 | 0.86 | 0.98 |
| | Main Transition Peak Temperature (° C.) | 91 | 91 | 92 | 92 | 93 | 140 | 101 | 89 | 93 | 94 | 95 | 90 | 91 | 92 |
| | Heat of Transition (J/g) | 66 | 86 | 72 | 69 | 92 | 62 | 53 | 56 | 81 | 72 | 62 | 53 | 54 | 60 |
| | E' (−20 to 40° C.) Max Value | 12.0 | 24.0 | 27.9 | 19.0 | 18.5 | 35.4 | 18.1 | 34.3 | 33.3 | 40.2 | 42.7 | 28.2 | 27.8 | 27.4 |
| | E' (−20 to 40° C.) Min Value | 2.0 | 3.9 | 3.7 | 4.1 | 3.1 | 6.2 | 3.4 | 4.6 | 4.5 | 6.1 | 7.2 | 7.2 | 6.5 | 5.1 |
| | E' (−20C) | 12.0 | 24.0 | 27.9 | 19.0 | 18.5 | 35.4 | 18.1 | 34.3 | 33.3 | 40.2 | 42.7 | 28.2 | 27.8 | 27.4 |
| | E' (40C) | 2.0 | 3.9 | 3.7 | 4.1 | 3.1 | 6.2 | 3.4 | 4.6 | 4.5 | 6.1 | 7.2 | 7.2 | 6.5 | 5.1 |
| | E' (−20° C.)/E' (40° C.) | 5.9 | 6.2 | 7.6 | 4.6 | 5.9 | 5.7 | 5.3 | 7.4 | 7.5 | 6.6 | 5.9 | 3.9 | 4.3 | 5.4 |
| | C hardness (20° C.) | 40 | 42 | 41 | 50 | 40 | 44 | 45 | 53 | 43 | 58 | 61 | 57 | 56 | 53 |
| | Specific Gravity | 0.09 | 0.088 | 0.14 | 0.13 | 0.104 | 0.11 | 0.115 | 0.085 | 0.09 | 0.09 | 0.11 | 0.09 | 0.09 | 0.11 |
| | Compression Set (%) | 65 | 63 | 65 | 60 | 65 | 64 | 64 | 62 | 65 | 63 | 61 | 63 | 64 | 64 |
| | Tearing Strength (kN/m) | 8.9 | 9.1 | 9.6 | 10.3 | 10.2 | 11.8 | 9.8 | 9.1 | 8.8 | 9.9 | 10.2 | 10.1 | 10.0 | 9.8 |
| | Rebound Resilience (%) | 42 | 44 | 42 | 43 | 40 | 45 | 41 | 43 | 41 | 42 | 42 | 47 | 45 | 46 |
| | | Comparative | Comparative | Comparative | Comparative | Comparative | Comparative | Comparative | Comparative | Comparative | Comparative | Comparative | Comparative | Comparative | Comparative |

-continued

| | | Example 15 | tive Ex-ample 1 | tive Ex-ample 2 | tive Ex-ample 3 | tive Ex-ample 4 | tive Ex-ample 5 | tive Ex-ample 6 | tive Ex-ample 7 | tive Ex-ample 8 |
|---|---|---|---|---|---|---|---|---|---|---|
| Mixed Contents of Resin Compositions | EVA 1 | | 100 | 100 | | | | | | |
| | EVA 2 | 95 | | | | | | | | |
| | PE1 | | | | 100 | | | | | |
| | PE2 | | | | | 100 | | | | |
| | PE3 | | | | | | 100 | | | |
| | PE4 | | | | | | | 100 | | |
| | PE5 | | | | | | | | 100 | 50 |
| | PE6 | | | | | | | | | |
| | ST1 | | | | | | | | | |
| | ST2 | | | | | | | | | |
| | ST3 | | | | | | | | | |
| | ST4 | 5 | | | | | | | | 50 |
| | ST5 | | | | | | | | | |
| | Cross-linking Agent (*1) | 0.6 | 0.6 | 0.6 | 0.6 | 0.6 | 0.6 | 0.6 | 0.6 | 0.6 |
| | Foaming Agent (*2) | 5 | 6.5 | 5 | 4 | 6.5 | 6.5 | 5 | 4 | 5 |
| | Filling Agent (*3) | 3 | 3 | 3 | 3 | 3 | 3 | 3 | 3 | 3 |
| | Processing Material (*4) | 0.5 | 0.5 | 0.5 | 0.5 | 0.5 | 0.5 | 0.5 | 0.5 | 0.5 |
| Proper-ties of Cross-linked Foams | tan δ (−20 to 40° C.) Max Value | 0.16 | 0.18 | 0.36 | 0.09 | 0.16 | 0.23 | 0.06 | 0.11 | 0.22 |
| | tan δ (−20 to 40° C.) Min Value | 0.13 | 0.14 | 0.07 | 0.03 | 0.10 | 0.07 | 0.03 | 0.05 | 0.11 |
| | tan δ (−20° C.) | 0.15 | 0.14 | 0.35 | 0.03 | 0.10 | 0.23 | 0.03 | 0.05 | 0.11 |
| | tan δ (40° C.) | 0.16 | 1.18 | 0.07 | 0.09 | 0.16 | 0.07 | 0.06 | 0.11 | 0.22 |
| | tan δ (−20)/tan δ (40° C.) | 0.93 | 0.12 | 5.00 | 0.30 | 0.61 | 3.17 | 0.54 | 0.52 | 0.5 |
| | Main Transition Peak Temperature (° C.) | 93 | 97 | 70 | 130 | 106 | 67 | — | — | 90 |
| | Heat of Transition (J/g) | 70 | 116 | 46 | 140 | 101 | 46 | — | — | 49 |
| | E' (−20 to 40° C.) | 22.2 | 38.4 | 36.1 | 35.5 | 21.2 | 10.8 | 23.8 | 26.8 | 28.8 |
| | Max Value | 3.6 | 3.5 | 1.5 | 20.2 | 3.5 | 1.4 | 17.4 | 14.0 | 10.3 |
| | E' (−20 to 40° C.) Min Value | 22.2 | 38.4 | 36.1 | 35.5 | 21.2 | 10.8 | 23.8 | 26.8 | 28.8 |
| | E' (−20C) | 3.6 | 3.5 | 1.5 | 20.2 | 3.5 | 1.4 | 17.4 | 14.0 | 10.3 |
| | E' (40 C) | 6.3 | 10.9 | 23.8 | 1.8 | 6.1 | 7.9 | 1.4 | 1.9 | 2.8 |
| | E' −20° C.)/E' (40° C.) | 54 | 45 | 53 | 60 | 42 | 45 | 52 | 63 | 58 |
| | C hardness (20° C.) | 0.1 | 0.058 | 0.163 | 0.089 | 0.082 | 0.149 | 0.11 | 0.15 | 0.1 |
| | Specific Gravity | 65 | 78 | 43 | 60 | 58 | 66 | 62 | 60 | 63 |
| | Compression Set (%) | | | | | | | | | |

-continued

| | | | | | | | | | |
|---|---|---|---|---|---|---|---|---|---|
| Tearing Strength (kN/m) | 9.0 | 4.7 | 11.2 | 8.9 | 9.1 | 9.3 | 9.2 | 9.6 | 10.8 |
| Rebound Resilience (%) | 43 | 47 | 66 | 33 | 32 | 69 | 25 | 30 | 48 |

PE1 to PE6: Thermoplastic polyolefin resin
ST1 to ST5: Styrene resin
*1: Dicumyl peroxide was used as a cross-linking agent.
*2: Azodicarbon amide was used as a foaming agent.
*3: Calcium carbonate was used as a filling agent.
*4: Stearate ester was used as a processing material.
*5: A sample whose property and the like can be measured was prepared but air bubble cells were not uniform.
EVA1: Ethylene-vinyl acetate copolymer, manufactured by Sumitomo Chemical Co., Ltd., Trade Name "EVATATE", Grade No. "D2011"
EVA2: Ethylene-vinyl acetate copolymer, manufactured by Tosoh Corporation, Trade Name "ULTRATHENE", Grade No. "634"
PE1: High-density polyethylene, manufactured by Asahi Kasei Chemicals Corporation, Trade Name "SUNTEC-HD", Grade No. "J240"
PE2: Low-density polyethylene, manufactured by Asahi Kasei Chemicals Corporation, Trade Name "SUNTEC-LD", Grade No. "M2270"
PE3: Styrene elastomer, manufactured by Sumitomo Chemical Co., Ltd., Trade Name "SUMITOMO TPE", Grade No. "907"
PE4: Olefin elastomer, manufactured by Sumitomo Chemical Co., Ltd., Trade Name "SUMITOMO TPE", Grade No. "821"
PE5: Ethylene-α-olefin, manufactured by Mitsui Chemicals, Inc., Trade Name "TAFMER", Grade No. "DF110"
PE6: Ethylene-α-olefin, manufactured by Mitsui Chemicals, Inc., Trade Name "TAFMER", Grade No. "DF810"
ST1: Styrene-butadiene-styrene copolymer, manufactured by Asahi Kasei Chemicals Corporation, Trade Name "TAFTECK", Grade No. "P1000"
ST2: Styrene-butadiene-butylene-styrene copolymer, manufactured by Asahi Kasei Chemicals Corporation, Trade Name "TAFTECK", Grade No. "P2000"
ST3: Styrene-butadiene-butylene-styrene copolymer, manufactured by Asahi Kasei Chemicals Corporation, Trade Name "TAFTECK", Grade No. "H1043"
ST4: Styrene-butadiene-styrene copolymer, manufactured by JSR Corporation, Trade Name JSR-TR", Grade No. "TR2250"
ST5: High styrene-butadiene copolymer, manufactured by ZEON Corporation, Trade Name "Nipol", Grade No. "2057SS"

The respective property values (specific gravity, storage elastic modulus, loss elastic modulus, and tan δ (−20° C.)/tan δ (40° C.) of EVA1 to ST5 are shown in Table 2.

TABLE 2

|  | Specific Gravity | Storage Elastic Modulus (MPa: 20° C.) | Loss Elastic Modulus (MPa: 20° C.) | tan δ −20° C./ 40° C. |
|---|---|---|---|---|
| EVA1 | 0.92 | 266 | 32.4 | 0.48 |
| EVA2 | 0.949 | 26.1 | 4.19 | 3.04 |
| PE1 | 0.966 | 1650 | 44.2 | 0.26 |
| PE2 | 0.923 | 380 | 49.5 | 0.49 |
| PE3 | 0.9 | 417 | 33.1 | 0.51 |
| PE4 | 0.91 | 131 | 17.4 | 0.87 |
| PE5 | 0.905 | 172 | 24.4 | 0.7 |
| PE6 | 0.885 | 35 | 2.21 | 4.05 |
| ST1 | 0.94 | 57.6 | 7.03 | 0.81 |
| ST2 | 0.98 | 1450 | 30.9 | 0.7 |
| ST3 | 0.97 | 1180 | 30.3 | 0.84 |
| ST4 | 0.98 | 339 | 19.7 | 0.68 |
| ST5 | 0.99 | 940 | 21.6 | 0.5 |

Figure 1:
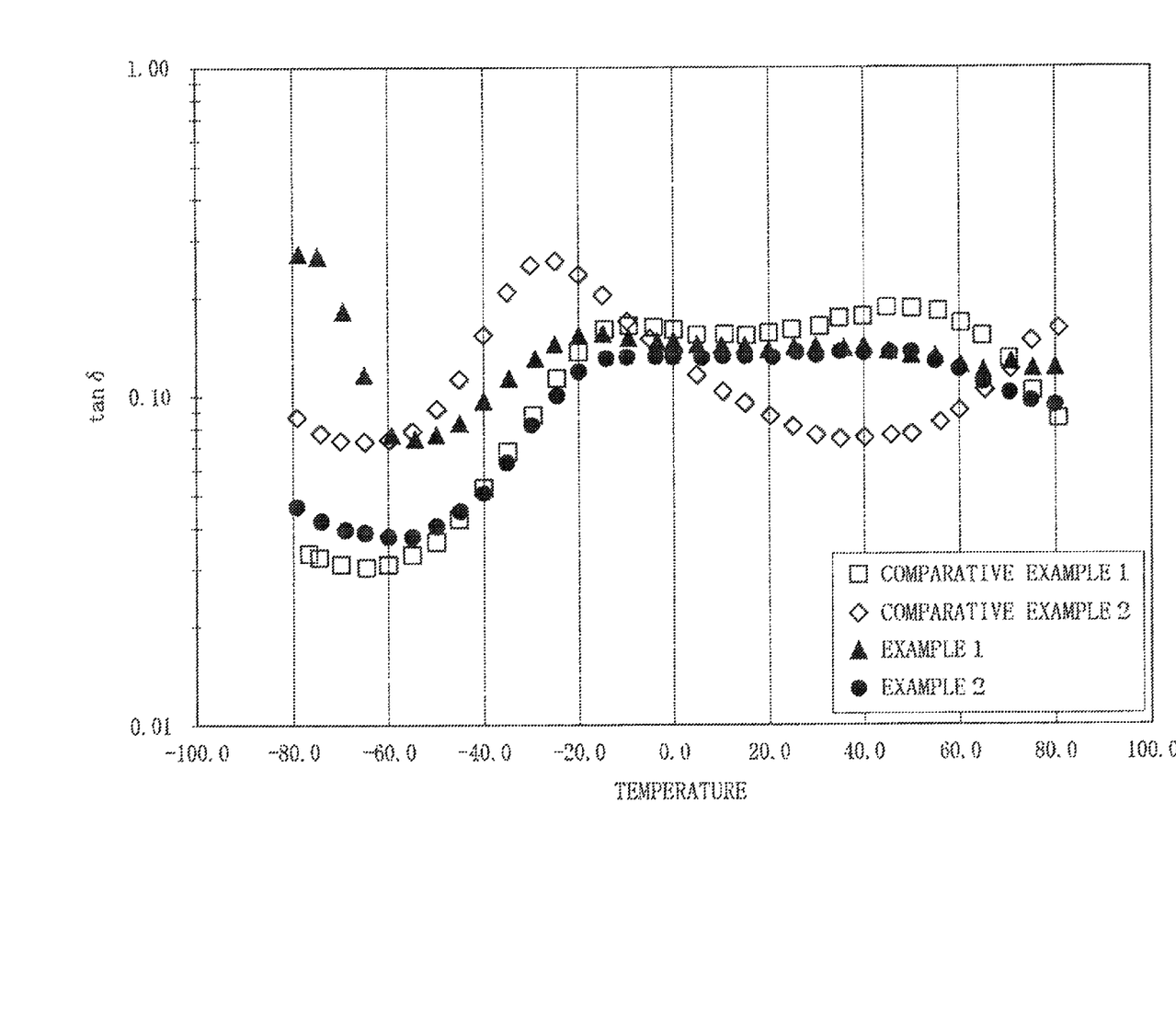
FIG. 1 is a graph showing the relationship between the temperature and tan δ.

FIG. 1 is a graph of the measured tan δ at the respective temperatures of the cross-linked foams obtained in Example 1, Example 2, Comparative Example 1 and Comparative Example 2.

In Example 1 to Example 15, shoe sole components (cross-linked foams) having less change in buffering property such as cushioning property due to the temperature change and being of light weight and having excellent mechanical properties were obtained.

As illustrated in FIG. 1, the cross-linked foams obtained in Example 1 and Example 2 each have tan δ indicating a constant value in a temperature range of −20° C. to 40° C.

This characteristic is an advantage inherent to the present invention and it has been found that less change in buffering property such as cushioning property is caused in a wide temperature range. Furthermore, according to a temperature-time conversion rule (an empirical rule in that, as an observation time axis is displaced with reference to a certain temperature in a dynamic viscoelasticity measuring of polymer, a low temperature moves to a short time side and a high temperature moves to a long time side, in parallel with each other, and hence they overlap each other), it is assumed that tan δ is stable at a normal temperature (18 to 25° C.) in a frequency range from a low frequency (1 Hz) to high frequency (1 kHz). For example, even in a rapid action, such as braking causing a high frequency, it is expectable that buffering property such as cushioning property can be securely provided.

It has been found that these cross-linked foams are excellent as shoe sole components (e.g., outersole, midsole, innersole and the like), and particularly appropriate for a midsole which is strongly required to have cushioning property.

Then, a cross-linked foam was molded by using the first resin component and the second resin component, and the respective property values were measured.

The respective property values (specific gravity, storage elastic modulus, loss elastic modulus, and tan δ (−20° C.)/tan δ (40° C.)) of resins used as the first resin component and the second resin component are shown in Table 3.

TABLE 3

|  | Specific Gravity | Storage Elastic Modulus (MPa: 20° C.) | Loss Elastic Modulus (MPa: 20° C.) | tan δ −20° C./ 40° C. |
|---|---|---|---|---|
| First Resin Component PE1 | 0.905 | 172 | 24.4 | 0.70 |
| First Resin Component PE2 | 0.903 | 198 | 18.8 | 1.00 |
| Second Resin Component ST1 | 0.98 | 1450 | 30.9 | 0.70 |
| Second Resin Component ST2 | 0.99 | 940 | 21.6 | 0.50 |

First Resin Component PE1: Ethylene-α-olefin, manufactured by Mitsui Chemicals, Inc., Trade Name "TAFMER", Grade No. "DF110"
First Resin Component PE2: Adhesive TPO, manufactured by Mitsui Chemicals, Inc., Trade Name "Admer PF508"
Second Resin Component ST1: Styrene-butadiene-styrene copolymer, manufactured by Asahi Kasei Chemicals Corporation, Trade Name "TAFTECK", Grade No. "P2000"
Second Resin Component ST2: High styrene-butadiene copolymer, manufactured by ZEON Corporation, Trade Name "Nipol", Grade No. "2057SS"

Example 16

81 parts by weight of ethylene-α-olefin copolymer as the first resin component PE1 (manufactured by Mitsui Chemicals, Inc., Trade Name "TAFMER", DF110), 10 parts by weight of adhesive TPO as the first resin component PE2 (manufactured by Mitsui Chemicals, Inc., Trade Name "Admer PF508"), and 9 parts by weight of styrene-butadiene-butylene-styrene copolymer (SBBS) (manufactured by Asahi Kasei Chemicals Corporation, "TAFTECK" P2000) were put into a sealing type kneader heated to 100° C. to 150° C., and were melt kneaded for 6 to 10 minutes at 40 rpm. Then, a given amount of each of a foaming agent, a cross-linking agent and a processing material was added into the melt kneaded subject by using an open roll heated to 100° C. to 120° C., and dispersion kneaded for about 8 to 15 minutes. Thus, a resin composition was obtained. 500 to 600 g of this resin composition was filled in a mold having a length of 150 mm, a width of 150 mm and a thickness of 20 mm, and press molded under a pressure of 15 MPa at a temperature of 160° C. for 30 to 35 minutes. Thus, a cross-linked foam was prepared. For a cross-linked foam to be served for measurement of dynamic viscoelasticity (tan δ), the thus prepared cross-linked foam may be used without any processes applied thereto, while it may be compressed by a heat mold to have a given specific gravity. In this case, 20 to 40 g of the cross-linked foam was filled in a mold having a length of 130 mm, a width of 220 mm and a thickness of 1 to 5 mm, pressed under a pressure of 15 MPa for 5 minutes at a temperature of 160° C., and then pressed under a pressure of 15 MPa at a temperature of 25° C. for cooling. By using them, various properties were measured. The results are shown in Table 4.

Resins respectively used in the Examples, the mixed contents (parts by weight) of the respective additives and various property values of the prepared cross-linked foams are shown in Table 4.

Example 17, and Comparative Examples 9 to 12

In place of the resin material and the mixed content used in Example 16, cross-linked foams were molded by resin materials and mixed contents shown in Table 4 by the same method, and the respective property values were measured. The results are shown in Table 4.

In Comparative Examples 9 to 12, no cross-linked foams could be formed.

temperature change, being of a light weight and having excellent mechanical properties can be obtained by cross-link foaming a resin composition containing a resin meeting the requirements of the first resin component and a resin meeting the requirements of the second resin component.

TABLE 2

|  |  | Example 16 | Example 17 | Comparative Example 9 | Comparative Example 10 | Comparative Example 11 | Comparative Example 12 |
|---|---|---|---|---|---|---|---|
|  | First Resin Component PE1 | 81 | 72 |  |  |  | 90 |
|  | First Resin Component PE2 | 10 | 20 |  |  |  |  |
|  | PE1 (*1) |  |  | 90 |  |  |  |
|  | ST (*2) |  |  |  |  | 90 |  |
|  | NY1 (*3) |  |  |  | 90 |  |  |
|  | Second Resin Component ST1 | 9 | 8 |  |  | 10 |  |
|  | Second Resin Component ST2 |  |  | 10 | 10 |  |  |
|  | NY2 (*4) |  | 1 |  |  |  | 10 |
|  | Cross-linking Agent (*5) | 0.6 | 0.6 | 0.6 | 0.6 | 0.6 | 0.6 |
|  | Foaming Agent (*6) | 6.5 | 6.5 | 6.5 | 6.5 | 6.5 | 6.5 |
|  | Filling Agent (*7) | 3 | 3 | 3 | 3 | 3 | 3 |
|  | Processing Material (*8) | 0.5 | 0.5 | 0.5 | 0.5 | 0.5 | 0.5 |
| Various Property Values | tan δ (−20 to 40° C.) Max Value | 0.14 | 0.14 | — | — | — | — |
|  | tan δ (−20 to 40° C.) Min Value | 0.12 | 0.12 | — | — | — | — |
|  | tan δ (−20° C.) | 0.12 | 0.12 | — | — | — | — |
|  | tan δ (40° C.)) | 0.14 | 0.14 | — | — | — | — |
|  | tan δ (−20)/tan δ (40° C.) | 0.82 | 0.82 | — | — | — | — |
|  | Main Transition Peak Temperature (° C.) | 92 | 92 | — | — | — | — |
|  | Heat of Transition (J/g) | 72 | 70 | — | — | — | — |
|  | E'(−20 to 40° C.) Max Value | 19 | 16.2 | — | — | — | — |
|  | E'(−20 to 40° C.) Min Value | 3.6 | 3.5 | — | — | — | — |
|  | E' (−20C) | 19 | 16.2 | — | — | — | — |
|  | E' (40 C) | 3.6 | 3.5 | — | — | — | — |
|  | E'(−20° C.)/E' (40° C.) | 5.2 | 4.6 | — | — | — | — |
|  | C hardness (20° C.) | 48 | 47 | — | — | — | — |
|  | Specific Gravity | 0.12 | 0.11 | — | — | — | — |
|  | Compression Set (%) | 52 | 48 | — | — | — | — |
|  | Tearing Strength (kN/m) | 10.2 | 9 | — | — | — | — |
|  | Rebound Resilience (%) | 41 | 40 | — | — | — | — |
|  | Sponge Forming Status (*9) | ○ | ○ | x | x | x | x |

*1: PE1: Ethylene-α-olelin, manufactured by Mitsui Chemicals, Inc., Trade Name "TAFMER", Grade No. "DF810"
*2: ST: Styrene-butadiene-butylene-styrene copolymer, manufactured by Asahi Kasei Chemicals Corporation, Trade Name"TAFTECK", Grade No. "H1043"
*3: NY1: 11 Nylon, manufactured by ARKEMA, Trade Name "RILSAN BMN P40"
*4: NY2: Polyether amide copolymer, manufactured by ARKEMA, Trade Name "PEBAX7233SA"
*5: Dicumyl peroxide was used as a cross-linking agent.
*6: Azodicarbon amide was used as a foaming agent.
*7: Calcium carbonate was used as a filling agent.
*8: Stearate ester was used as a processing material.
*9: ○; Moldable,
Δ; Moldable but with non-uniform foam,
x; Non-moldable or non-kneadable The properties of the resins of the aforesaid *1 to *4 shown in Table 4 are shown in Table 5. The *1 to *4 shown in Table 4 do not meet the requirements of the first resin component and the requirements of the second resin component.

TABLE 5

|  | Specific Gravity | Storage Elastic Modulus (MPa: 20° C.) | Loss Elastic Modulus (MPa: 20° C.) | tan δ −20° C./40° C. |
|---|---|---|---|---|
| *1PE1 | 0.885 | 35 | 2.21 | 4.05 |
| *2ST | 0.97 | 1180 | 30.3 | 0.84 |
| *3NY1 | 1.05 | 436 | 60.9 | 0.67 |
| *4NY2 | 1.01 | 850 | 68.1 | 0.21 |

It has been found from the results of Example 17 that a shoe sole component (cross-linked foam) having less change in buffering property such as cushioning property due to the

INDUSTRIAL APPLICABILITY

A shoe sole component can be used as the one which limits change in properties, such as strength and cushioning property, even in a wide temperature range from severe cold at −10° C. or lower to high temperature conditions exceeding 30° C.

The invention claimed is:

1. A shoe sole component comprising a cross-linked foam of a resin composition, the resin composition containing a thermoplastic polyolefin resin and a styrene resin, the resin composition containing between 60 parts and 95 parts by weight of the thermoplastic polyolefin resin in 100 parts by weight of the resins in the resin composition, the styrene resin having a content of styrene of 65 to 75% by weight of the styrene resin, wherein the shoe sole component comprises:
- tan δ [20° C. to 40° C.] at a frequency of 10 Hz measured according to JIS K 7244-4 of 0.01 to 0.5,
- tan δ [−20° C.] tan δ [40° C.] at a frequency of 10 Hz of 0.7 to 1.3,
- a specific gravity measured according to JIS K 7311 of 0.05 to 0.2, and
- a tear strength measured according to JIS K 6252 being more than or equal to 8.8 kN/m.

2. The shoe sole component according to claim 1, wherein a main transition peak temperature measured by differential scanning calorimetry (DSC) according to JIS K 7121 is 90 to 105° C., and the heat of transition measured by differential scanning calorimetry (DSC) according to JIS K 7122 is 60 to 100 J/g.

3. The shoe sole component according to claim 1, wherein a storage elastic modulus E' [−20° C. to 40° C.] at −20 to 40° C. and at a frequency of 10 Hz measured according to JIS K 7244-4 is 2 to 50 MPa, and a value of E' [−20° C.]/E' [40° C.] in a storage elastic modulus E' [−20° C.] at −20° C. and a storage elastic modulus E' [40° C.] at 40° C. is 2 to 20.

4. The shoe sole component according to claim 1, wherein a compression set value measured according to ASTM D395 for 22 hours at 20±3° C. is not more than 65%.

5. The shoe sole component according to claim 1, wherein a C hardness at 20° C. measured according to Japan Rubber Association Standard SRIS0101 is 35 to 70.

6. The shoe sole component according to claim 1, wherein a rebound resilience measured according to JIS K 6255 is not less than 40%.

7. The shoe sole component according to claim 1, wherein the styrene resin is styrene-butadiene-butylene-styrene copolymer (SBBS).

* * * * *